United States Patent
Black

(10) Patent No.: US 10,524,154 B2
(45) Date of Patent: *Dec. 31, 2019

(54) EMPLOYING CORRELATION MEASUREMENTS TO REMOTELY EVALUATE BEAM FORMING ANTENNAS

(71) Applicant: Pivotal Commware, Inc., Kirkland, WA (US)

(72) Inventor: Eric James Black, Bothell, WA (US)

(73) Assignee: Pivotal Commware, Inc., Kirkland, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/292,022

(22) Filed: Mar. 4, 2019

(65) Prior Publication Data

US 2019/0289482 A1    Sep. 19, 2019

Related U.S. Application Data

(63) Continuation of application No. 15/925,612, filed on Mar. 19, 2018, now Pat. No. 10,225,760.

(51) Int. Cl.
*H04B 7/06* (2006.01)
*H04W 24/10* (2009.01)
(Continued)

(52) U.S. Cl.
CPC .............. *H04W 24/10* (2013.01); *H01Q 9/04* (2013.01); *H04B 7/0632* (2013.01); *H04B 7/0814* (2013.01); *H04B 7/0617* (2013.01)

(58) Field of Classification Search
CPC .. H01Q 9/0407; H04B 7/0617; H04B 7/0632; H04B 7/0814
(Continued)

(56) References Cited

U.S. PATENT DOCUMENTS

| 6,133,880 A | 10/2000 | Grangeat et al. |
| 7,205,949 B2 | 4/2007 | Turner |

(Continued)

FOREIGN PATENT DOCUMENTS

| CN | 106797074 A | 5/2017 |
| KR | 10 2016 011310 A | 9/2016 |

(Continued)

OTHER PUBLICATIONS

U.S. Appl. No. 14/510,947, filed Oct. 9, 2014, pp. 1-76.

(Continued)

*Primary Examiner* — Emmanuel Bayard
(74) *Attorney, Agent, or Firm* — John W. Branch; Lowe Graham Jones PLLC

(57) ABSTRACT

A system for evaluating the performance of beam forming antennas based on correlations of signal to noise measurements of individual scattering elements in the antennas. A signal source provides a signal having a first frequency to an input of the antenna. Each of the antenna's scattering elements are individually selectable to radiate the signal. A control signal sequentially turns off and on each scattering element while radiating the signal. Also, a characteristic of the signal radiated by each scattering element is separately measured and each difference between the characteristics are identified and compared to one or more threshold values. A report regarding the differences that exceed the threshold value is provided to a user.

20 Claims, 9 Drawing Sheets

(51) Int. Cl.
*H01Q 9/04* (2006.01)
*H04B 7/08* (2006.01)

(58) Field of Classification Search
USPC .................................... 375/219, 267, 299
See application file for complete search history.

(56) References Cited

U.S. PATENT DOCUMENTS

| | | | |
|---|---|---|---|
| 9,356,356 | B2 | 5/2016 | Chang et al. |
| 9,385,435 | B2 | 7/2016 | Bily et al. |
| 9,450,310 | B2 | 9/2016 | Bily et al. |
| 9,551,785 | B1* | 1/2017 | Geer ................. G01S 7/292 |
| 9,711,852 | B2 | 7/2017 | Chen et al. |
| 9,806,414 | B2 | 10/2017 | Chen et al. |
| 9,806,415 | B2 | 10/2017 | Chen et al. |
| 9,806,416 | B2 | 10/2017 | Chen et al. |
| 9,812,779 | B2 | 11/2017 | Chen et al. |
| 10,033,109 | B1 | 7/2018 | Gummalla et al. |
| 10,225,760 | B1* | 3/2019 | Black ................... H04W 24/10 |
| 2002/0196185 | A1 | 12/2002 | Bloy |
| 2005/0237265 | A1 | 10/2005 | Durham et al. |
| 2008/0181328 | A1 | 7/2008 | Harel et al. |
| 2009/0207091 | A1 | 8/2009 | Anagnostou et al. |
| 2010/0302112 | A1 | 12/2010 | Lindenmeier et al. |
| 2012/0194399 | A1 | 8/2012 | Bily et al. |
| 2014/0171811 | A1* | 6/2014 | Lin .................... A61B 5/02125 |
| | | | 600/485 |
| 2014/0293904 | A1 | 10/2014 | Dai et al. |
| 2015/0109178 | A1 | 4/2015 | Hyde et al. |
| 2015/0109181 | A1* | 4/2015 | Hyde ................. H01Q 15/0053 |
| | | | 343/833 |
| 2015/0116153 | A1 | 4/2015 | Chen et al. |
| 2015/0162658 | A1 | 6/2015 | Bowers et al. |
| 2015/0222021 | A1 | 8/2015 | Stevenson et al. |
| 2015/0276926 | A1 | 10/2015 | Bowers et al. |
| 2015/0276928 | A1 | 10/2015 | Bowers et al. |
| 2015/0288063 | A1 | 10/2015 | Johnson et al. |
| 2015/0318618 | A1* | 11/2015 | Chen .................... H01Q 21/005 |
| | | | 343/750 |
| 2015/0372389 | A1* | 12/2015 | Chen .................... H01Q 13/20 |
| | | | 343/772 |
| 2016/0037508 | A1 | 2/2016 | Sun |
| 2016/0149308 | A1 | 5/2016 | Chen et al. |
| 2016/0149309 | A1 | 5/2016 | Chen et al. |
| 2016/0149310 | A1 | 5/2016 | Chen et al. |
| 2016/0164175 | A1 | 6/2016 | Chen et al. |
| 2016/0241367 | A1 | 8/2016 | Irmer et al. |
| 2016/0345221 | A1 | 11/2016 | Axmon et al. |
| 2017/0127295 | A1 | 5/2017 | Black et al. |
| 2017/0127332 | A1 | 5/2017 | Axmon et al. |
| 2017/0155193 | A1 | 6/2017 | Black et al. |
| 2017/0187123 | A1 | 6/2017 | Black et al. |
| 2017/0187426 | A1 | 6/2017 | Su et al. |
| 2017/0238141 | A1 | 8/2017 | Lindoff et al. |
| 2017/0339575 | A1 | 11/2017 | Kim et al. |
| 2018/0027555 | A1 | 1/2018 | Kim et al. |
| 2018/0066991 | A1* | 3/2018 | Mueller ................... G01J 4/02 |
| 2018/0233821 | A1 | 8/2018 | Pham et al. |
| 2018/0270729 | A1 | 9/2018 | Ramachandra et al. |

FOREIGN PATENT DOCUMENTS

| | | | |
|---|---|---|---|
| WO | 2015196044 | A1 | 12/2015 |
| WO | 2017014842 | A1 | 1/2017 |

OTHER PUBLICATIONS

Office Communication for U.S. Appl. No. 15/925,612 dated Jun. 15, 2018, pp. 1-12.
Office Communication for U.S. Appl. No. 15/870,758 dated Oct. 1, 2018, pp. 1-19.
Office Communication for U.S. Appl. No. 16/049,630 dated Oct. 4, 2018, pp. 1-17.
Office Communication for U.S. Appl. No. 16/136,119 dated Nov. 23, 2018, pp. 1-16.
Office Communication for U.S. Appl. No. 16/136,119 dated Mar. 15, 2019, pp. 1-12.
International Search Report and Written Opinion for International Patent Application No. PCT/US2019/022942 dated Jul. 4, 2019.
Office Communication for U.S. Appl. No. 16/049,630 dated Jun. 24, 2019.
Office Communication for U.S. Appl. No. 16/280,939 dated Jul. 18, 2019.
Office Communication for U.S. Appl. No. 16/136,119 dated Mar. 15, 2019.
Office Communication for U.S. Appl. No. 16/268,469 dated May 16, 2019.
Office Communication for U.S. Appl. No. 16/049,630 dated Apr. 12, 2019.
Office Communication for U.S. Appl. No. 16/280,939 dated May 13, 2019.
Office Communication for U.S. Appl. No. 16/440,815 dated Jul. 17, 2019.
Office Communication for U.S. Appl. No. 16/358,112 dated May 15, 2019.
International Search Report and Written Opinion for International Patent Application No. PCT/US19/022987 dated Jul. 2, 2019.
International Search Report and Written Opinion for International Patent Application No. PCT/US2019/022942 dated Jul. 4, 2019, pp. 1-12.
Yurduseven et al., "Dual-Polarization Printed Holographic Multibeam Metasurface Antenna" Aug. 7, 2017, IEEE Antennas and Wireless Propagation Letters. PP. 10.1109/LAWP.2017, p. 1-4.
Office Communication for U.S. Appl. No. 16/049,630 dated Jun. 24, 2019, pp. 1-7.
Office Communication for U.S. Appl. No. 16/280,939 dated Jul. 18, 2019, pp. 1-21.
Office Communication for U.S. Appl. No. 16/136,119 dated Mar. 15, 2019, pp. 1-23.
Office Communication for U.S. Appl. No. 16/268,469 dated May 16, 2019, pp. 1-50.
Office Communication for U.S. Appl. No. 16/049,630 dated Apr. 12, 2019, pp. 1-41.
Office Communication for U.S. Appl. No. 16/280,939 dated May 13, 2019, pp. 1-35.
Office Communication for U.S. Appl. No. 16/440,815 dated Jul. 17, 2019, pp. 1-24.
Office Communication for U.S. Appl. No. 16/358,112 dated May 15, 2019, pp. 1-29.
International Search Report and Written Opinion for International Patent Application No. PCT/US19/022987 dated Jul. 2, 2019, pp. 1-13.

* cited by examiner

EMPLOYING CORRELATION MEASUREMENTS TO REMOTELY EVALUATE BEAM FORMING ANTENNAS

CROSS-REFERENCE TO RELATED APPLICATION(S)

This Utility Patent Application is a Continuation of U.S. patent application Ser. No. 15/925,612 filed on Mar. 19, 2018, now U.S. Pat. No. 10,225,760 issued on Mar. 5, 2019, the benefit of which is claimed under 35 U.S.C. § 120, and the contents of which is further incorporated in entirety by reference.

TECHNICAL FIELD

The invention relates generally to identifying characteristics of individual tuning elements in a holographic metasurface antenna. Further, a relatively low signal to noise ratio test is individually applied to statistically detect whether or not each particular tuning element is behaving correctly.

BACKGROUND

A holographic metasurface antenna (HMA) can include thousands of individual tuning elements, such as varactors. The correct behavior of each tuning elements is typically verified during the manufacturing process of the HMA. However, once the HMA is installed in a real-world environment, individual tuning element behavior can degrade for a variety of reasons. For example, these reasons can include one or more of ambient temperature changes, mechanical damage to the HMA, manufacturing anomalies, or bird strike on the surface of the HMA can cause incorrect behavior of one or more scanning elements. Although it is possible to easily measure the overall RF characteristics of an HMA by turning all of it's scattering elements of and on, a characteristic of an individual scattering element is generally more difficult to measure.

Additionally, in a real-world installation of an HMA it can be too costly or impractical to employ additional hardware located a minimum distance away to physically test the individual behavior of each scattering element. Thus, the various difficulties in detecting abnormal behavior of each scattering element for one or more installed HMAs, has created an opportunity for a solution that can be operated remotely and does not require additional hardware separately located from the HMAs.

DETAILED DESCRIPTION OF THE EMBODIMENTS

Figure 1A:
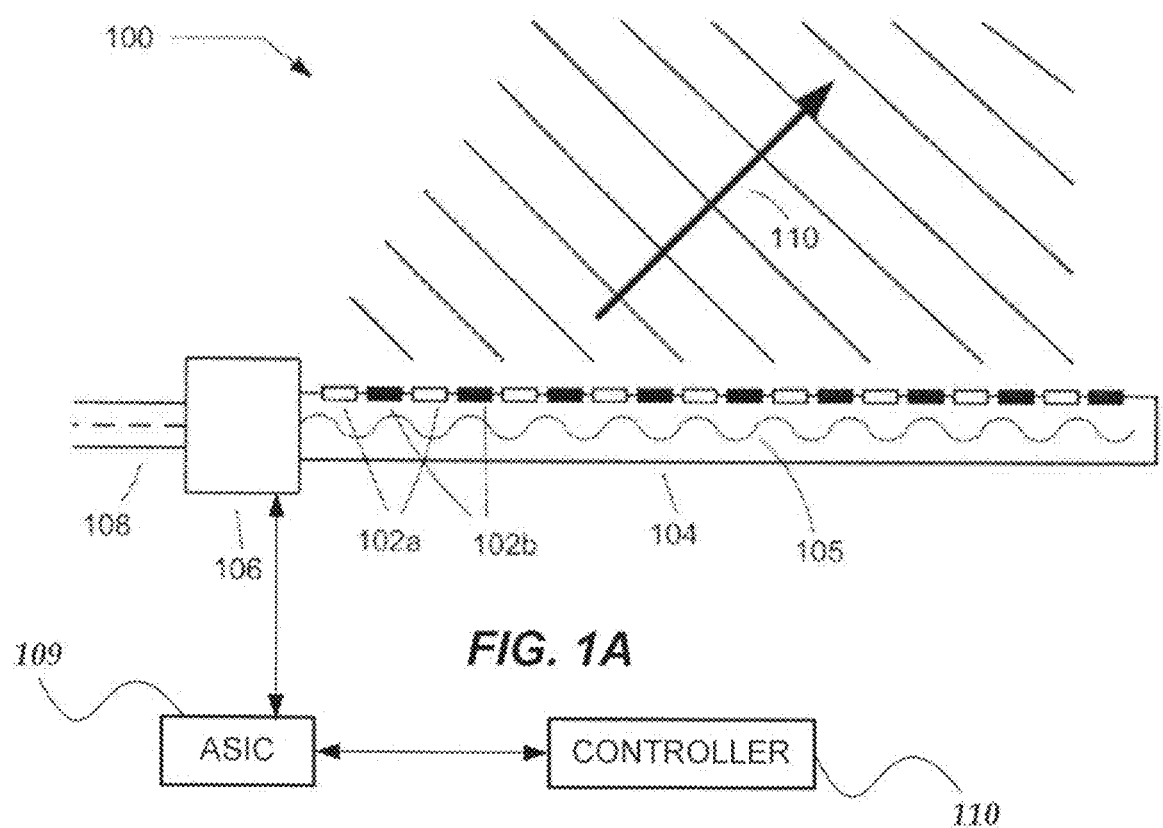
FIG. 1A shown an embodiment of an exemplary surface scattering antenna with multiple varactor elements arranged to propagate electromagnetic waves in such a way as to form an exemplary instance of holographic metasurface antennas (HMA)

The present invention now will be described more fully hereinafter with reference to the accompanying drawings, which form a part hereof, and which show, by way of illustration, specific embodiments by which the invention may be practiced. This invention may, however, be embodied in many different forms and should not be construed as limited to the embodiments set forth herein; rather, these embodiments are provided so that this disclosure will be thorough and complete, and will fully convey the scope of the invention to those skilled in the art. Among other things, the present invention may be embodied as methods or devices. Accordingly, the present invention may take the form of an entirely hardware embodiment, an entirely software embodiment or an embodiment combining software and hardware aspects. The following detailed description is, therefore, not to be taken in a limiting sense.

Throughout the specification and claims, the following terms take the meanings explicitly associated herein, unless the context clearly dictates otherwise. The phrase "in one embodiment" as used herein does not necessarily refer to the same embodiment, though it may. Similarly, the phrase "in another embodiment" as used herein does not necessarily refer to a different embodiment, though it may. As used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

The following briefly describes the embodiments of the invention in order to provide a basic understanding of some aspects of the invention. This brief description is not intended as an extensive overview. It is not intended to identify key or critical elements, or to delineate or otherwise narrow the scope. Its purpose is merely to present some concepts in a simplified form as a prelude to the more detailed description that is presented later.

Briefly stated, various embodiments are directed towards evaluating the performance of beam forming antennas based on correlations of signal to noise measurements of individual scattering elements of the antennas. In one or more embodiments, an RF source is employed to provide a radio frequency (RF) signal having a first frequency to an input of the antenna. Further, each of the antenna's tuning elements are individually selectable to scatter the RF signal. A bias signal is employed to sequentially bias off and on each scattering element while each scattering element is individually emitting an RF signal. Also, a characteristic of the RF signal emitted by each scattering element is separately measured and each difference between the characteristics are identified and compared to one or more threshold values. A report regarding the differences that exceed the threshold value is provided to a user.

In one or more embodiments, the bias signal may be a pseudo-random bit sequence (PSRB). Also, in one or more embodiments, the RF signal may be a standing wave, a constant tone signal, or the like. Additionally, the antenna may be an array of beam forming antennas that may be holographic metasurface antennas. Further, in one or more embodiments, the measured characteristic may be a return loss value of a varactor that is employed to control operation of a scattering element. A coupler may be connected to the feed network to drain away a portion of the RF signal that is internally reflected with the scattering element, e.g., $1/30^{th}$ or more of the emitted RF signal.

In one or more embodiments, a confidence value may be employed to iteratively determine measured characteristic differences that always exceeds the threshold value for particular scattered elements until a confidence level value is equivalent to a number of iterations. Each iteration employs another RF signal having a different frequency and employ the bias signal to sequentially bias each scattering element for individual measurement of its characteristic and identification of differences that exceed the threshold value.

In one or more embodiments, in response to all scattering elements in a row having measured characteristic differences that all exceed the threshold level, identifying an electronic circuit that controls the row as defective. Also, in one or more embodiments, in response to a portion or more of the plurality of scattering elements in the antenna controlled by a first controller and having measured characteristic differences that all exceed the threshold level, identifying the first controller as defective. Additionally, in one or more embodiments, a beam forming antenna may be a holographic metasurface antenna (HMA), or the like, that can be arranged to operate solely, or in combination with one or more other antennas to form an antenna array.

Illustrated Operating Environment

In one or more embodiments, a HMA may use an arrangement of controllable elements to produce an object wave. Also, in one or more embodiments, the controllable elements may employ individual electronic circuits, such as varactors, that have two or more different states. In this way, an object wave can be modified by changing the states of the electronic circuits for one or more of the controllable elements. A control function, such as a hologram function, can be employed to define a current state of the individual controllable elements for a particular object wave. In one or more embodiments, the hologram function can be predetermined or dynamically created in real time in response to various inputs and/or conditions. In one or more embodiments, a library of predetermined hologram functions may be provided. In the one or more embodiments, any type of HMA can be used to that is capable of producing the beams described herein.

FIG. 1A illustrates one embodiment of a HMA which takes the form of a surface scattering antenna 100 (i.e., a HMA) that includes multiple scattering elements 102a, 102b that are distributed along a wave-propagating structure 104 or other arrangement through which a reference wave 105 can be delivered to the scattering elements. The wave propagating structure 104 may be, for example, a microstrip, a coplanar waveguide, a parallel plate waveguide, a dielectric rod or slab, a closed or tubular waveguide, a substrate-integrated waveguide, or any other structure capable of supporting the propagation of a reference wave 105 along or within the structure. A reference wave 105 is input to the wave-propagating structure 104. The scattering elements 102a, 102b may include scattering elements that are embedded within, positioned on a surface of, or positioned within an evanescent proximity of, the wave-propagation structure 104. Examples of such scattering elements include, but are not limited to, those disclosed in U.S. Pat. Nos. 9,385,435; 9,450,310; 9,711,852; 9,806,414; 9,806,415; 9,806,416; and 9,812,779 and U.S. Patent Applications Publication Nos. 2017/0127295; 2017/0155193; and 2017/0187123, all of which are incorporated herein by reference in their entirety. Also, any other suitable types or arrangement of scattering elements can be used.

The surface scattering antenna may also include at least one feed connector 106 that is configured to couple the wave-propagation structure 104 to a feed structure 108 which is coupled to a reference wave source (not shown). The feed structure 108 may be a transmission line, a waveguide, or any other structure capable of providing an electromagnetic signal that may be launched, via the feed connector 106, into the wave-propagating structure 104. The feed connector 106 may be, for example, a coaxial-to-microstrip connector (e.g. an SMA-to-PCB adapter), a coaxial-to-waveguide connector, a mode-matched transition section, etc.

The scattering elements 102a, 102b are adjustable scattering elements having electromagnetic properties that are adjustable in response to one or more external inputs. Adjustable scattering elements can include elements that are adjustable in response to voltage inputs (e.g. bias voltages for active elements (such as varactors, transistors, diodes) or for elements that incorporate tunable dielectric materials (such as ferroelectrics or liquid crystals)), current inputs (e.g. direct injection of charge carriers into active elements), optical inputs (e.g. illumination of a photoactive material), field inputs (e.g. magnetic fields for elements that include nonlinear magnetic materials), mechanical inputs (e.g. MEMS, actuators, hydraulics), or the like. In the schematic example of FIG. 1A, scattering elements that have been adjusted to a first state having first electromagnetic properties are depicted as the first elements 102a, while scattering elements that have been adjusted to a second state having second electromagnetic properties are depicted as the second elements 102b. The depiction of scattering elements having first and second states corresponding to first and second electromagnetic properties is not intended to be limiting: embodiments may provide scattering elements that are discretely adjustable to select from a discrete plurality of states corresponding to a discrete plurality of different electromagnetic properties, or continuously adjustable to select from a continuum of states corresponding to a continuum of different electromagnetic properties.

In the example of FIG. 1A, the scattering elements 102a, 102b have first and second couplings to the reference wave 105 that are functions of the first and second electromagnetic properties, respectively. For example, the first and second couplings may be first and second polarizabilities of the scattering elements at the frequency or frequency band of the reference wave. On account of the first and second couplings, the first and second scattering elements 102a, 102b are responsive to the reference wave 105 to produce a plurality of scattered electromagnetic waves having amplitudes that are functions of (e.g. are proportional to) the respective first and second couplings. A superposition of the scattered electromagnetic waves comprises an electromagnetic wave that is depicted, in this example, as an object wave 110 that radiates from the surface scattering antenna 100.

FIG. 1A illustrates a one-dimensional array of scattering elements 102a, 102b. It will be understood that two- or three-dimensional arrays can also be used. In addition, these arrays can have different shapes. Moreover, the array illustrated in FIG. 1A is a regular array of scattering elements 102a, 102b with equidistant spacing between adjacent scattering elements, but it will be understood that other arrays may be irregular or may have different or variable spacing between adjacent scattering elements. Also, Application Specific Integrated Circuit (ASIC) 109 is employed to control the operation of the row of scattering elements 102a and 102b. Further, controller 110 may be employed to control the operation of one or more ASICs that control one or more rows in the array.

Figure 1B:
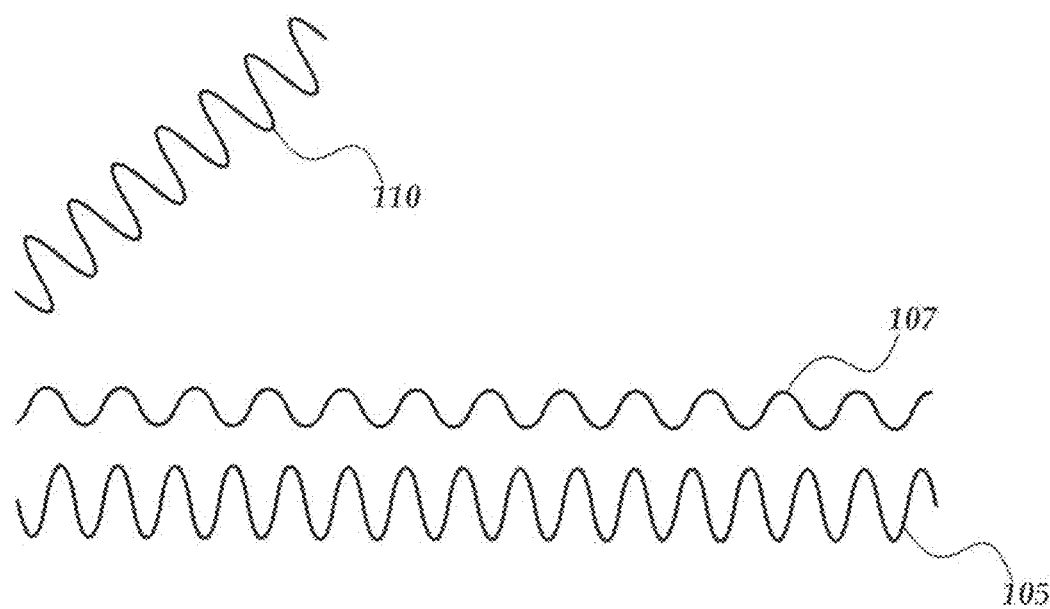
FIG. 1B shows a representation of one embodiment of a synthetic array illustrating a reference waveform and a hologram waveform (modulation function) that in combination provide an object waveform of electromagnetic waves.
Figure 1C:
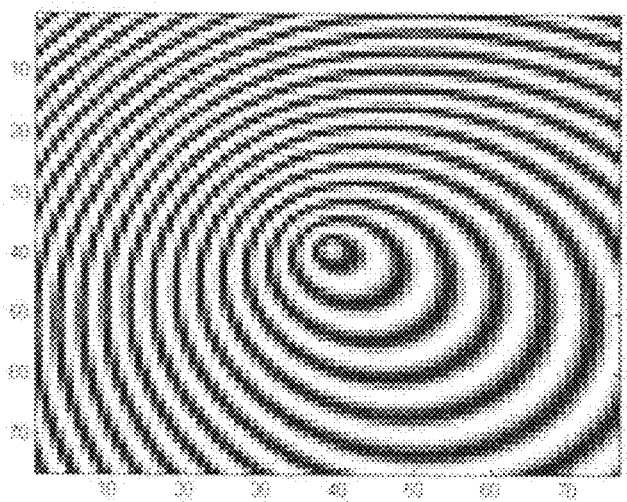
FIG. 1C shows an embodiment of an exemplary modulation function for an exemplary surface scattering antenna.
Figure 1D:
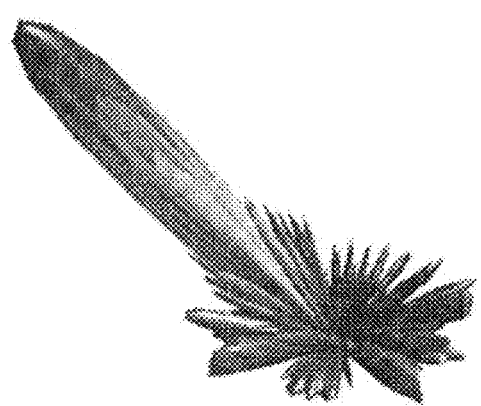
FIG. 1D shows an embodiment of an exemplary beam of electromagnetic waves generated by the modulation function of FIG. 1C.

The array of scattering elements 102a, 102b can be used to produce a far-field beam pattern that at least approximates a desired beam pattern by applying a modulation pattern 107 (e.g., a hologram function, H) to the scattering elements receiving the reference wave ($\psi_{ref}$) 105 from a reference wave source, as illustrated in FIG. 1B. Although the modulation pattern or hologram function 107 in FIG. 1B is illustrated as sinusoidal, it will be recognized non-sinusoidal functions (including non-repeating or irregular functions) may also be used. FIG. 1C illustrates one example of a modulation pattern and FIG. 1D illustrates one example of a beam generated using that modulation pattern.

In at least some embodiments, a computing system can calculate, select (for example, from a look-up table or database of modulation patterns) or otherwise determine the modulation pattern to apply to the scattering elements 102a, 102b receiving the RF energy that will result in an approximation of desired beam pattern. In at least some embodiments, a field description of a desired far-field beam pattern is provided and, using a transfer function of free space or any other suitable function, an object wave ($\psi_{obj}$) 110 at an antenna's aperture plane can be determined that results in the desired far-field beam pattern being radiated. The modulation function (e.g., hologram function) can be determined which will scatter the reference wave 105 into the object wave 110. The modulation function (e.g., hologram function) is applied to scattering elements 102a, 102b, which are excited by the reference wave 105, to form an approximation of an object wave 110 which in turn radiates from the aperture plane to at least approximately produce the desired far-field beam pattern.

In at least some embodiments, the hologram function H (i.e., the modulation function) is equal the complex conjugate of the reference wave and the object wave, i.e., $\psi_{ref}^* \psi_{obj}$. Examples of such arrays, antennas, and the like can be found at U.S. Pat. Nos. 9,385,435; 9,450,310; 9,711,852; 9,806,414; 9,806,415; 9,806,416; and 9,812,779 and U.S. Patent Applications Publication Nos. 2017/0127295; 2017/0155193; and 2017/0187123, all of which are incorporated herein by reference in their entirety. In at least some embodiments, the surface scattering antenna may be adjusted to provide, for example, a selected beam direction (e.g. beam steering), a selected beam width or shape (e.g. a fan or pencil beam having a broad or narrow beam width), a selected arrangement of nulls (e.g. null steering), a selected arrangement of multiple beams, a selected polarization state (e.g. linear, circular, or elliptical polarization), a selected overall phase, or any combination thereof. Alternatively, or additionally, embodiments of the surface scattering antenna may be adjusted to provide a selected near field radiation profile, e.g. to provide near-field focusing or near-field nulls.

The surface scattering antenna can be considered a holographic beamformer which, at least in some embodiments, is dynamically adjustable to produce a far-field radiation pattern or beam. In some embodiments, the surface scattering antenna includes a substantially one-dimensional wave-propagating structure 104 having a substantially one-dimensional arrangement of scattering elements. In other embodiments, the surface scattering antenna includes a substantially two-dimensional wave-propagating structure 104 having a substantially two-dimensional arrangement of scattering elements. In at least some embodiments, the array of scattering elements 102a, 102b can be used to generate a narrow, directional far-field beam pattern, as illustrated, for example, in FIG. 1C. It will be understood that beams with other shapes can also be generated using the array of scattering elements 102a, 102b.

In at least some of the embodiments, the narrow far-field beam pattern can be generated using a holographic metasurface antenna (HMA) and may have a width that is 5 to 20 degrees in extent. The width of the beam pattern can be determined as the broadest extent of the beam or can be defined at a particular region of the beam, such as the width at 3 dB attenuation. Any other suitable method or definition for determining width can be used.

A wider beam pattern (also referred to as a "radiation pattern") is desirable in a number of applications, but the achievable width may be limited by, or otherwise not available using, a single HMA. Multiple instances of HMAs can be positioned in an array of HMAs to produce a wider composite far-field beam pattern. It will be recognized, however, that the individual beam patterns from the individual HMAs will often interact and change the composite far-field beam pattern so that, at least in some instances, without employing the one or more embodiments of the invention, the simple combination of the outputs of multiple instances of HMAs produces a composite far-field beam pattern that does not achieve the desired or intended configuration.

Figure 2A:
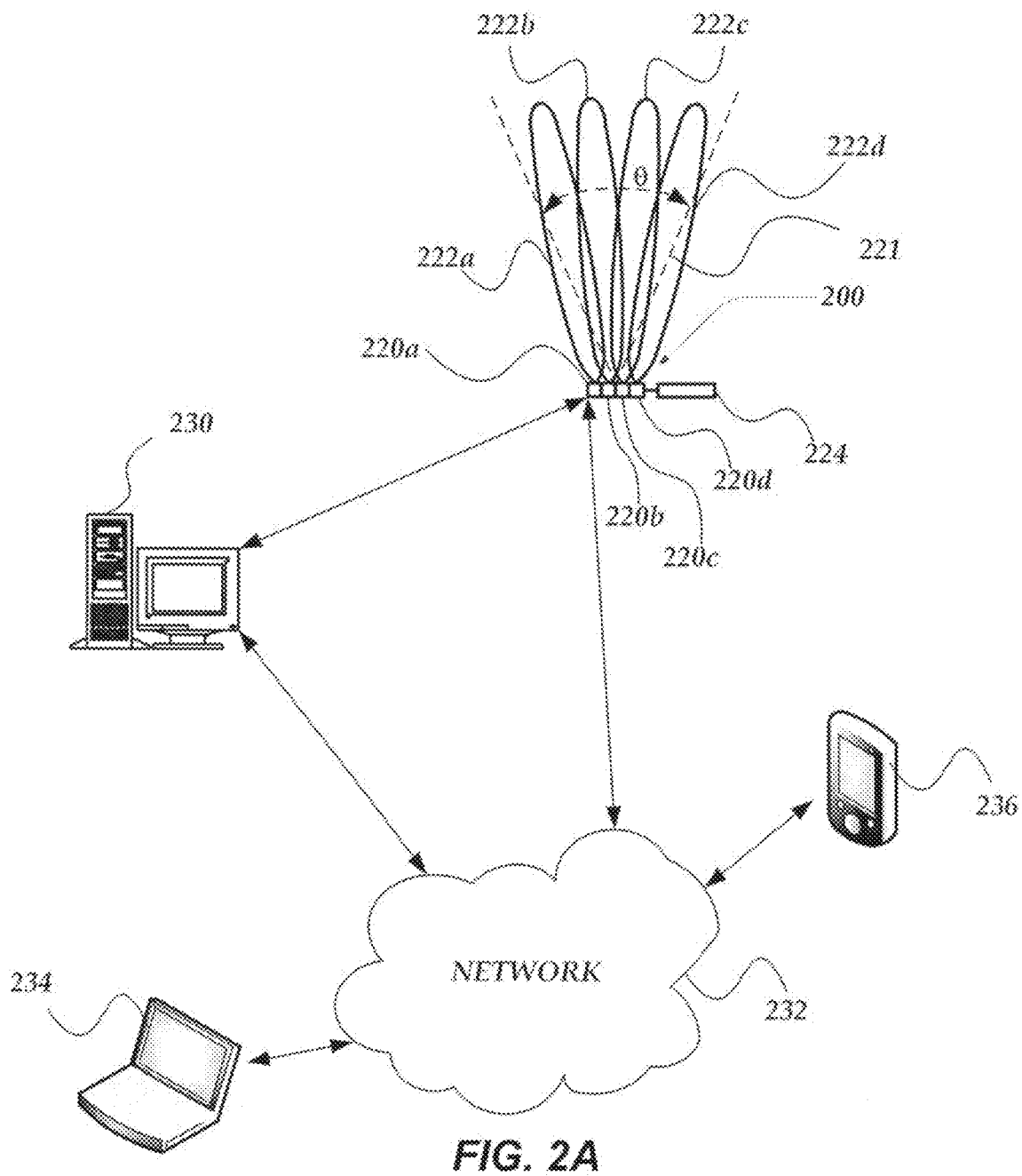
FIG. 2A shows a side view an embodiment of an exemplary environment, including an arrangement of multiple instances of HMAs propagating beams, in which various embodiments of the invention may be implemented.

FIG. 2A illustrates one embodiment of a beam-forming system 200 with an arrangement of multiple instances of HMAs (e.g., surface scattering antennas or holographic beamformers) 220a, 220b, 220c, 220d that each produce a beam 222a, 222b, 222c, 222d (i.e., a far-field radiation pattern) and are coupled to a reference wave source 224 (or multiple reference wave sources). In the illustrated example, the beams 222a, 222b, 222c, 222d are arranged to produce a coverage area 221 which, at least in some embodiments, can be described by angle θ (for example, the coverage angle at 3 Db). It will be understood that other methods of describing the desired coverage area can also be used.

Figure 2B:
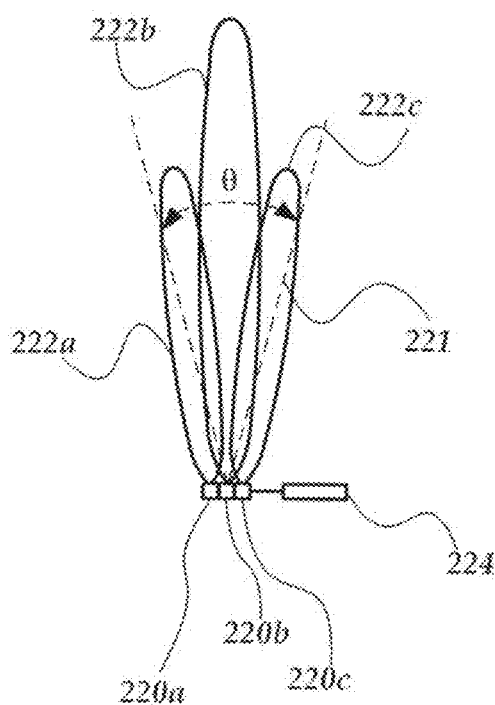
FIG. 2B shows a side view of another embodiment of an exemplary arrangement of multiple instances of HMAs.
Figure 2C:
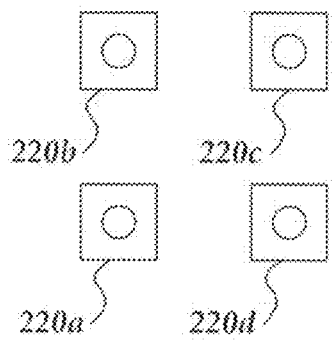
FIG. 2C shows a top view of yet another embodiment of an exemplary arrangement of multiple instances of HMAs.

The HMAs 220a, 220b, 220c, 220d may be identical in arrangement or composition of the array of scattering elements or may different in arrangement or composition of the array of scattering elements. In some embodiments, different reference waves may be provided to some or all of the HMAs. In at least some embodiments, the position or orientation of one or more of the HMAs may be adjustable relative to the other HMAs. In FIG. 2A, the illustrated arrangement of HMAs is one-dimensional and regular. It will be understood, however, that two- or three-dimensional arrangements of HMAs can also be used. In addition, these arrangements can have different shapes. Moreover, the arrangement illustrated in FIG. 2A is a regular arrangement of HMAs 220a, 220b, 220c, 220d with equidistant spacing between adjacent HMAs, but it will be understood that other arrangements may be irregular or may have different or variable spacing between adjacent HMAs. As an example, FIG. 2B illustrates another arrangement of HMAs 220a, 220b, 220c that produce beams 222a, 222b, 222c where the middle beam 222b is substantially different in size and shape from the other two beams 222a, 222c. FIG. 2C illustrates, in a top view, yet another arrangement of HMAs 220a, 220b, 220c, 220d which form a two-dimensional array.

Figure 2D:
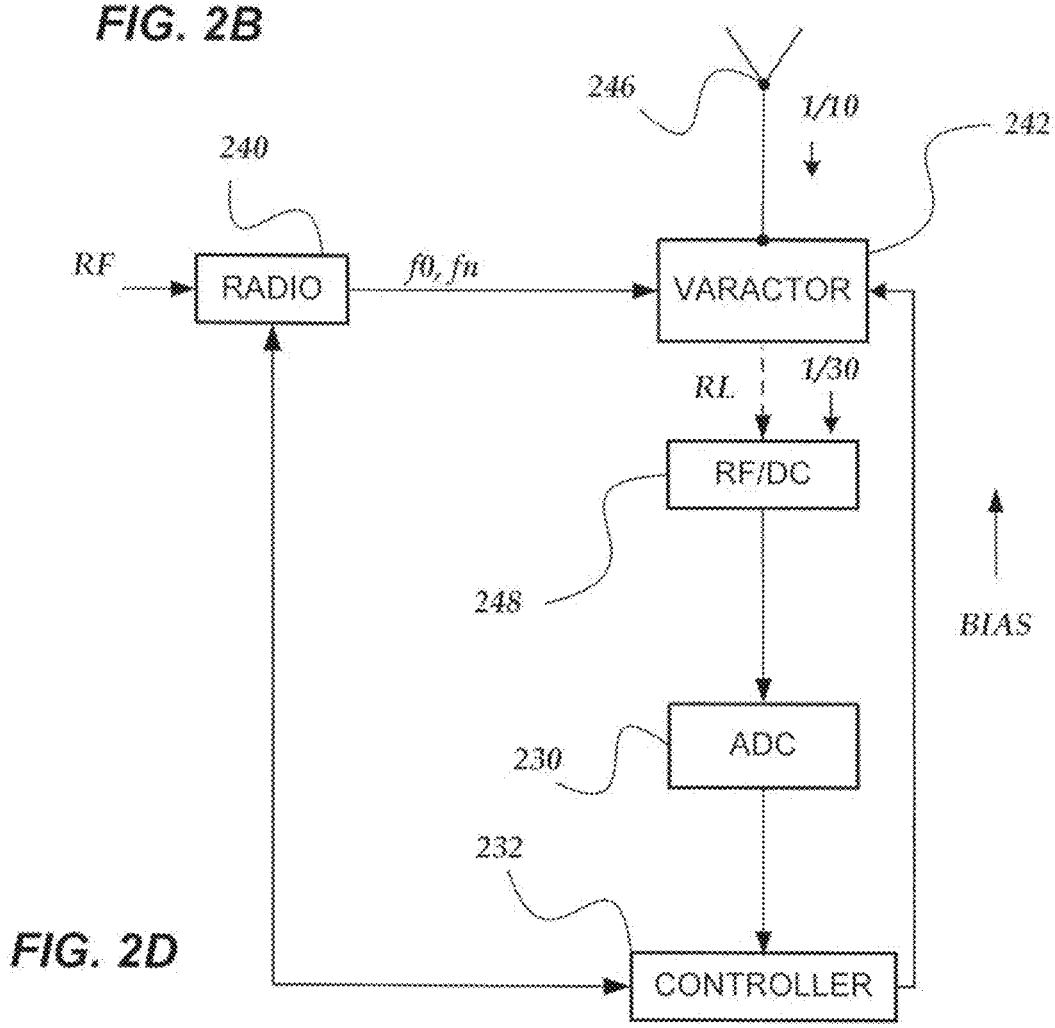
FIG. 2D illustrates a schematic view of a configuration of a varactor in a scattering element for an HMA.

FIG. 2D is a schematic diagram of an individual scattering element in an HMA. Radio device 240 emits RF signals at selectable frequencies (f0 though fn) that are provided to varactor 242. When varactor 242 is biased on, the RF signal is emitted by scattering element 246. Controller 232 controls the bias signal that turns varactor 242 off and on. Also, controller controls the operation of radio device 240. Further, a portion of the RF signal (reflected loss—RL) is reflected back towards varactor 242, e.g., $\frac{1}{10}$ of the RF signal. And a portion of the RL, e.g., $\frac{1}{30}^{th}$, is drained away from varactor 242 by a coupler (not shown) into RF/DC module 248. Module 248 converts the RF signal into an analog DC signal which is provided to ADC module 230. Controller 232 receives a digitized version of the analog signal which is employed to identify the characteristic (RL) of the scattering element when it is turned on to emit an RF signal and when it is turned off.

Additionally, although not shown in FIG. 2D, the invention is not limited to a radio device as the RF source to emit the RF signal. Rather, in other embodiments, many different types of RF sources may be employed to emit the RF signal. For example, RF oscillators, Scalar Signal generators, Vector Network Analyzers (VNAs), or the like may also be employed to emit the RF signal in various embodiments.

Furthermore, in one or more embodiments, when a VNA is employed as an RF source to emit the RF signal, the VNA may be employed to measure the RL characteristic of scattering element 246 instead of employing RF/DC module 248 and ADC module 230 to do so. In this case, RF/DC module 248 and ADC module 230 can be eliminated from the invention as shown in the schematic diagram of FIG. 2D.

Also, although not shown, the invention is not limited to a varactor as a control element that enables scattering element 246 to emit the RF signal. Rather, many different types of control elements may be employed in this way. For example, one or more other embodiments may instead employ Field Effect Transistors (FETs), Microelectromechanical Systems (MEMS), Bipolar Junction Transistors (BSTs), or the like to enable scattering element 246 to turn on and turn off emitting the RF signal. In at least some embodiments, the system 200 includes, or is coupled to, a computer device 230 or other control device that can control one or more of the HMAs 220a, 220b, 220c 220d, the reference wave source 224, or any other components of the system, or any combination thereof. For example, the computer device 230 may be capable of dynamically changing the HMAs (e.g., dynamically alter the hologram function) to modify the beam generated using the HMA. Alternatively or additionally, the system 200 may include, or be coupled to, a network 232 which is in turn coupled to a computer device, such as computer device 234 or mobile device 236. The computer device 234 or mobile device 232 can control one or more of the HMAs 220a, 220b, 220c 220d, the reference wave source 224, or any other components of the system.

Various embodiments of a computer device 230, 234 (which may also be a mobile device 232) are described in more detail below in conjunction with FIG. 3. Briefly, however, computer device 230, 234 includes virtually various computer devices enabled to control the arrangement 200. Based on the desired beam pattern, the computer device 230, 234 may alter or otherwise modify one or more of the HMAs 220a, 220b, 220c, 220d.

Network 232 may be configured to couple network computers with other computing devices, including computer device 230, computer device 234, mobile device 236, HMAs 220a, 220b, 220c, 220d, or reference wave source 224 or any combination thereof. Network 232 may include various wired and/or wireless technologies for communicating with a remote device, such as, but not limited to, USB cable, Bluetooth®, Wi-Fi®, or the like. In some embodiments, network 232 may be a network configured to couple network computers with other computing devices. In various embodiments, information communicated between devices may include various kinds of information, including, but not limited to, processor-readable instructions, remote requests, server responses, program modules, applications, raw data, control data, system information (e.g., log files), video data, voice data, image data, text data, structured/unstructured data, or the like. In some embodiments, this information may be communicated between devices using one or more technologies and/or network protocols.

In some embodiments, such a network may include various wired networks, wireless networks, or various combinations thereof. In various embodiments, network 232 may be enabled to employ various forms of communication technology, topology, computer-readable media, or the like, for communicating information from one electronic device to another. For example, network 232 can include—in addition to the Internet—LANs, WANs, Personal Area Networks (PANs), Campus Area Networks, Metropolitan Area Networks (MANs), direct communication connections (such as through a universal serial bus (USB) port), or the like, or various combinations thereof.

In various embodiments, communication links within and/or between networks may include, but are not limited to, twisted wire pair, optical fibers, open air lasers, coaxial cable, plain old telephone service (POTS), wave guides, acoustics, full or fractional dedicated digital lines (such as T1, T2, T3, or T4), E-carriers, Integrated Services Digital Networks (ISDNs), Digital Subscriber Lines (DSLs), wireless links (including satellite links), or other links and/or carrier mechanisms known to those skilled in the art. Moreover, communication links may further employ various ones of a variety of digital signaling technologies, including without limit, for example, DS-0, DS-1, DS-2, DS-3, DS-4, OC-3, OC-12, OC-48, or the like. In some embodiments, a router (or other intermediate network device) may act as a link between various networks—including those based on different architectures and/or protocols—to enable information to be transferred from one network to another. In other embodiments, remote computers and/or other related electronic devices could be connected to a network via a modem and temporary telephone link. In essence, network 232 may include various communication technologies by which information may travel between computing devices.

Network 232 may, in some embodiments, include various wireless networks, which may be configured to couple various portable network devices, remote computers, wired networks, other wireless networks, or the like. Wireless networks may include various ones of a variety of sub-networks that may further overlay stand-alone ad-hoc networks, or the like, to provide an infrastructure-oriented connection for at least client computer. Such sub-networks may include mesh networks, Wireless LAN (WLAN) networks, cellular networks, or the like. In one or more of the various embodiments, the system may include more than one wireless network.

Network 232 may employ a plurality of wired and/or wireless communication protocols and/or technologies. Examples of various generations (e.g., third (3G), fourth (4G), or fifth (5G)) of communication protocols and/or technologies that may be employed by the network may include, but are not limited to, Global System for Mobile communication (GSM), General Packet Radio Services (GPRS), Enhanced Data GSM Environment (EDGE), Code Division Multiple Access (CDMA), Wideband Code Division Multiple Access (W-CDMA), Code Division Multiple Access 2000 (CDMA2000), High Speed Downlink Packet Access (HSDPA), Long Term Evolution (LTE), Universal Mobile Telecommunications System (UMTS), Evolution-Data Optimized (Ev-DO), Worldwide Interoperability for Microwave Access (WiMax), time division multiple access (TDMA), Orthogonal frequency-division multiplexing (OFDM), ultra-wide band (UWB), Wireless Application Protocol (WAP), user datagram protocol (UDP), transmission control protocol/Internet protocol (TCP/IP), various portions of the Open Systems Interconnection (OSI) model protocols, session initiated protocol/real-time transport protocol (SIP/RTP), short message service (SMS), multimedia messaging service (MMS), or various ones of a variety of other communication protocols and/or technologies. In essence, the network may include communication technologies by which information may travel between light source 104, photon receiver 106, and tracking computer device 110, as well as other computing devices not illustrated.

In various embodiments, at least a portion of network 232 may be arranged as an autonomous system of nodes, links, paths, terminals, gateways, routers, switches, firewalls, load balancers, forwarders, repeaters, optical-electrical converters, or the like, which may be connected by various communication links. These autonomous systems may be configured to self-organize based on current operating conditions and/or rule-based policies, such that the network topology of the network may be modified.

Illustrative Network Computer

Figure 3:
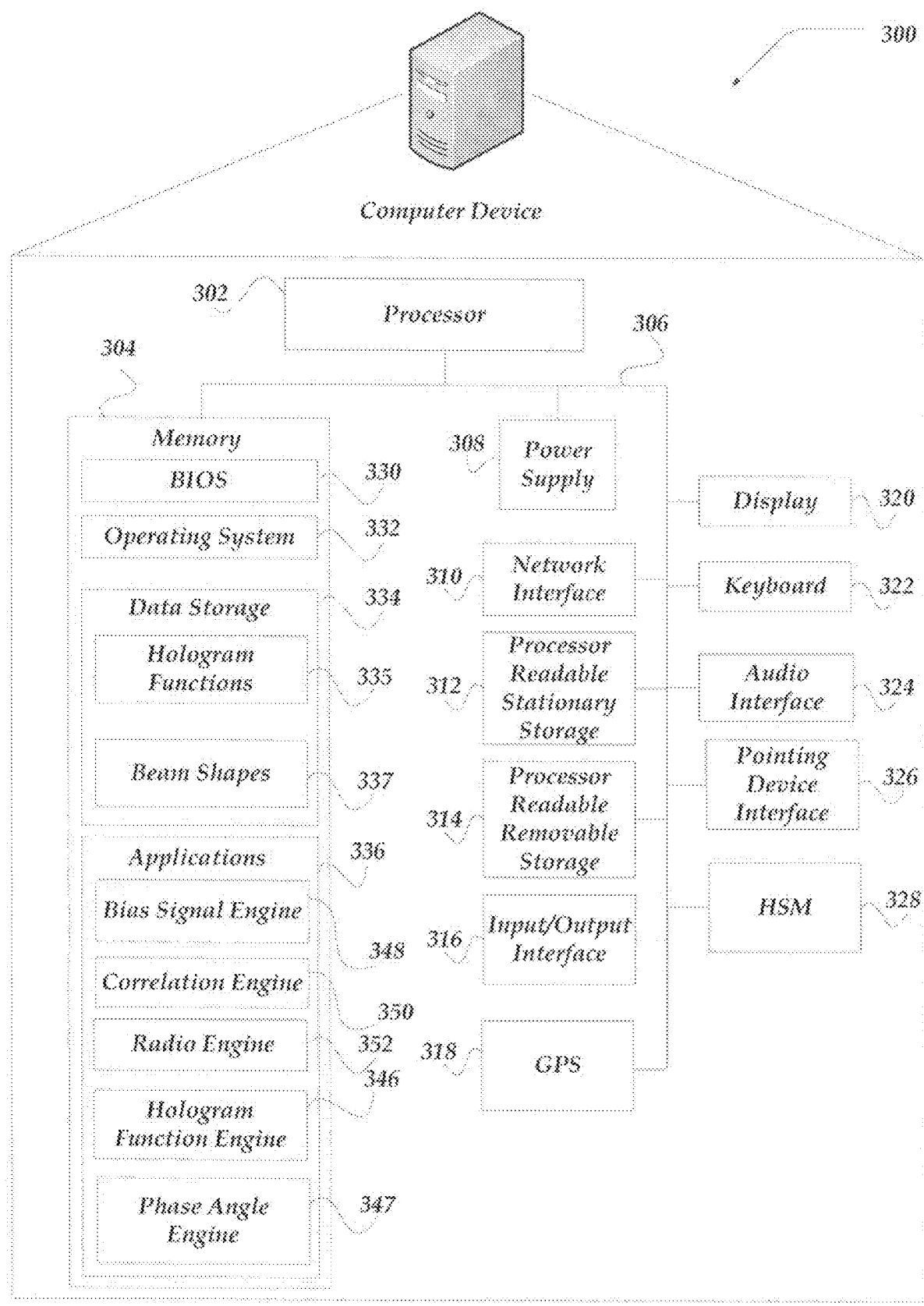
FIG. 3 shows an embodiment of an exemplary computer device that may be included in a system such as that shown in FIG. 2A.

FIG. 3 shows one embodiment of an exemplary computer device 300 that may be included in an exemplary system implementing one or more of the various embodiments. Computer device 300 may include many more or less components than those shown in FIG. 3. However, the components shown are sufficient to disclose an illustrative embodiment for practicing these innovations. Computer device 300 may include a desktop computer, a laptop computer, a server computer, a client computer, and the like. Computer device 300 may represent, for example, one embodiment of one or more of a laptop computer, smartphone/tablet, computer device 230, 234 or mobile device 236 of FIG. 2A or may be part of the system 200, such as a part of one or more of the HMAs 220a, 220b, 220c, 220d, or reference wave source 224 or the like.

As shown in FIG. 3, computer device 300 includes one or more processors 302 that may be in communication with one or more memories 304 via a bus 306. In some embodiments, one or more processors 302 may be comprised of one or more hardware processors, one or more processor cores, or one or more virtual processors. In some cases, one or more of the one or more processors may be specialized processors or electronic circuits particularly designed to perform one or more specialized actions, such as, those described herein. Computer device 300 also includes a power supply 308, network interface 310, non-transitory processor-readable stationary storage device 312 for storing data and instructions, non-transitory processor-readable removable storage device 314 for storing data and instructions, input/output interface 316, GPS transceiver 318, display 320, keyboard 322, audio interface 324, pointing device interface 326, and HSM 328, although a computer device 300 may include fewer or more components than those illustrated in FIG. 3 and described herein. Power supply 308 provides power to computer device 300.

Network interface 310 includes circuitry for coupling computer device 300 to one or more networks, and is constructed for use with one or more communication protocols and technologies including, but not limited to, protocols and technologies that implement various portions of the Open Systems Interconnection model (OSI model), global system for mobile communication (GSM), code division multiple access (CDMA), time division multiple access (TDMA), user datagram protocol (UDP), transmission control protocol/Internet protocol (TCP/IP), Short Message Service (SMS), Multimedia Messaging Service (MMS), general packet radio service (GPRS), WAP, ultra wide band (UWB), IEEE 802.16 Worldwide Interoperability for Microwave Access (WiMax), Session Initiation Protocol/Real-time Transport Protocol (SIP/RTP), or various ones of a variety of other wired and wireless communication protocols. Network interface 310 is sometimes known as a transceiver, transceiving device, or network interface card (NIC). Computer device 300 may optionally communicate with a base station (not shown), or directly with another computer.

Audio interface 324 is arranged to produce and receive audio signals such as the sound of a human voice. For example, audio interface 324 may be coupled to a speaker and microphone (not shown) to enable telecommunication with others and/or generate an audio acknowledgement for some action. A microphone in audio interface 324 can also be used for input to or control of computer device 300, for example, using voice recognition.

Display 320 may be a liquid crystal display (LCD), gas plasma, electronic ink, light emitting diode (LED), Organic LED (OLED) or various other types of light reflective or light transmissive display that can be used with a computer. Display 320 may be a handheld projector or pico projector capable of projecting an image on a wall or other object.

Computer device 300 may also comprise input/output interface 316 for communicating with external devices or computers not shown in FIG. 3. Input/output interface 316 can utilize one or more wired or wireless communication technologies, such as USB™, Firewire™, Wi-Fi™, WiMax, Thunderbolt™, Infrared, Bluetooth™, Zigbee™, serial port, parallel port, and the like.

Also, input/output interface 316 may also include one or more sensors for determining geolocation information (e.g., GPS), monitoring electrical power conditions (e.g., voltage sensors, current sensors, frequency sensors, and so on), monitoring weather (e.g., thermostats, barometers, anemometers, humidity detectors, precipitation scales, or the like), or the like. Sensors may be one or more hardware sensors that collect and/or measure data that is external to computer device 300. Human interface components can be physically separate from computer device 300, allowing for remote input and/or output to computer device 300. For example, information routed as described here through human interface components such as display 320 or keyboard 322 can instead be routed through the network interface 310 to appropriate human interface components located elsewhere on the network. Human interface components include various components that allow the computer to take input from, or send output to, a human user of a computer. Accordingly, pointing devices such as mice, styluses, track balls, or the like, may communicate through pointing device interface 326 to receive user input.

Memory 304 may include Random Access Memory (RAM), Read-Only Memory (ROM), and/or other types of memory. Memory 304 illustrates an example of computer-readable storage media (devices) for storage of information such as computer-readable instructions, data structures, program modules or other data. Memory 304 stores a basic input/output system (BIOS) 330 for controlling low-level operation of computer device 300. The memory also stores an operating system 332 for controlling the operation of computer device 300. It will be appreciated that this component may include a general-purpose operating system such as a version of UNIX, or LINUX™, or a specialized operating system such as Microsoft Corporation's Windows® operating system, or the Apple Corporation's IOS® operating system. The operating system may include, or interface with a Java virtual machine module that enables control of hardware components and/or operating system operations via Java application programs. Likewise, other runtime environments may be included.

Memory 304 may further include one or more data storage 334, which can be utilized by computer device 300 to store, among other things, applications 336 and/or other data. For example, data storage 334 may also be employed to store information that describes various capabilities of computer device 300. In one or more of the various embodiments, data storage 334 may store hologram function information 335 or beam shape information 337. The hologram function information 335 or beam shape information 337 may then be provided to another device or computer based on various ones of a variety of methods, including being sent as part of a header during a communication, sent upon request, or the like. Data storage 334 may also be employed to store social networking information including address books, buddy lists, aliases, user profile information, or the like. Data storage 334 may further include program code, data, algorithms, and the like, for use by one or more processors, such as processor 302 to execute and perform actions such as those actions described below. In one embodiment, at least some of data storage 334 might also be stored on another component of computer device 300, including, but not limited to, non-transitory media inside non-transitory processor-readable stationary storage device 312, processor-readable removable storage device 314, or various other computer-readable storage devices within computer device 300, or even external to computer device 300.

Applications 336 may include computer executable instructions which, if executed by computer device 300, transmit, receive, and/or otherwise process messages (e.g., SMS, Multimedia Messaging Service (MMS), Instant Message (IM), email, and/or other messages), audio, video, and enable telecommunication with another user of another mobile computer. Other examples of application programs include calendars, search programs, email client applications, IM applications, SMS applications, Voice Over Internet Protocol (VOIP) applications, contact managers, task managers, transcoders, database programs, word processing programs, security applications, spreadsheet programs, games, search programs, and so forth. Applications 336 may include hologram function engine 346, phase angle engine 347, bias signal engine 348, correlation engine 350, or radio engine 352, that performs actions further described below. In one or more of the various embodiments, one or more of the applications may be implemented as modules and/or components of another application. Further, in one or more of the various embodiments, applications may be implemented as operating system extensions, modules, plugins, or the like.

Furthermore, in one or more of the various embodiments, specialized applications such as hologram function engine 346, phase angle engine 347, bias signal engine 348, correlation engine 350, and/or radio engine 352, may be operative in a networked computing environment to perform specialized actions described herein. In one or more of the various embodiments, these applications, and others, may be executing within virtual machines and/or virtual servers that may be managed in a networked environment such as a local network, wide area network, or cloud-based based computing environment. In one or more of the various embodiments, in this context the applications may flow from one physical computer device within the cloud-based environment to another depending on performance and scaling considerations automatically managed by the cloud computing environment. Likewise, in one or more of the various embodiments, virtual machines and/or virtual servers dedicated to the hologram function engine 346, phase angle engine 347, bias signal engine 348, correlation engine 350, and/or radio engine 352, may be provisioned and de-commissioned automatically.

Also, in one or more of the various embodiments, the hologram function engine 346, phase angle engine 347, bias signal engine 348, correlation engine 350, radio engine 352, or the like may be located in virtual servers running in a networked computing environment rather than being tied to one or more specific physical computer devices.

Further, computer device 300 may comprise HSM 328 for providing additional tamper resistant safeguards for generating, storing and/or using security/cryptographic information such as, keys, digital certificates, passwords, passphrases, two-factor authentication information, or the like. In some embodiments, hardware security module may be employed to support one or more standard public key infrastructures (PKI), and may be employed to generate, manage, and/or store keys pairs, or the like. In some embodiments, HSM 328 may be a stand-alone computer device, in other cases, HSM 328 may be arranged as a hardware card that may be installed in a computer device.

Additionally, in one or more embodiments (not shown in the figures), the computer device may include one or more embedded logic hardware devices instead of one or more CPUs, such as, an Application Specific Integrated Circuits (ASICs), Field Programmable Gate Arrays (FPGAs), Programmable Array Logics (PALs), or the like, or combination thereof. The embedded logic hardware devices may directly execute embedded logic to perform actions. Also, in one or more embodiments (not shown in the figures), the computer device may include one or more hardware microcontrollers instead of a CPU. In one or more embodiments, the one or more microcontrollers may directly execute their own embedded logic to perform actions and access their own internal memory and their own external Input and Output Interfaces (e.g., hardware pins and/or wireless transceivers) to perform actions, such as System On a Chip (SOC), or the like.

As indicated above, one or more particular shapes of beam patterns, such as wide beam patterns, narrow beam patterns or composite beam patterns, may be desirable in a number of applications at different times for different conditions, but may not be practical or even available using a single HMA. In one or more embodiments, multiple instances of HMAs may be positioned in an array to produce a wide variety of composite, near-field, and/or far-field beam patterns without significant cancellation or signal loss. Since the object waves of multiple instances of HMAs may interfere with each other, adjustment to their object waves may be desirable to generate a beam pattern "closer" to the desired shape of a particular beam pattern. Any suitable methodology or metric can be used to determine the "closeness" of a beam pattern to a desired beam pattern including, but not limited to, an average deviation (or total deviation or sum of the magnitudes of deviation) over the entire beam pattern or a defined portion of the beam pattern from the desired beam pattern or the like.

In one of more embodiments, a physical arrangement of HMAs may be existing or can be constructed and coupled to a reference wave source. In one or more embodiments, a hologram function can be calculated, selected, or otherwise provided or determined for each of the HMAs. Each of the HMAs includes an array of dynamically adjustable scattering elements that have an adjustable electromagnetic response to a reference wave from the reference wave source. The hologram function for the HMA defines adjustments of the electromagnetic responses for the scattering elements of the HMA to produce an object wave that is emitted from the HMA in response to the reference wave. The object waves produced by the HMAs may be combined to produce a composite beam. Any suitable method or technique can be used to determine or provide any arrangement of HMAs to produce a composite beam, such as the exemplary composite beams illustrated in FIGS. 2A and 2B.

Generalized Operations

Although the operation of a beam antenna array is typically thoroughly tested during manufacturing to assure that the array and its individual scattering elements are behaving correctly, age and/or change to the physical environment where the array is installed can adversely affect the behavior of one or more scattering elements and degrade the performance of the array. To detect changes in the behavior of individual scattering elements in the field remotely, a novel method and system is described in greater detail below.

Figure 4:
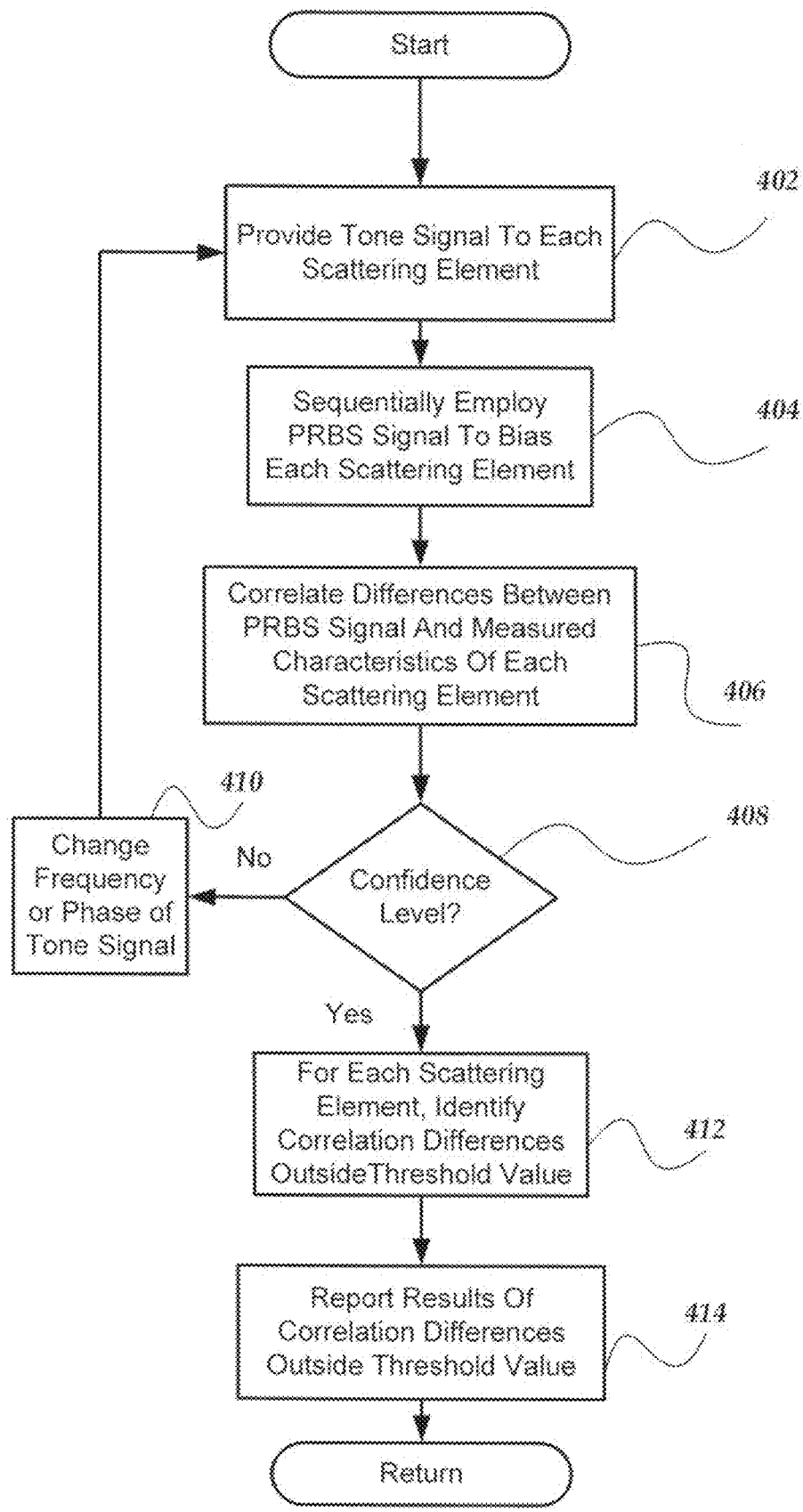
FIG. 4 illustrates an embodiment of a logical flow diagram for an exemplary method of correlating and reporting differences in behavior for scattering elements that are biased by a Pseudo-Random Bit Sequence (PRBS) and emitting a tone signal in an HMA.
Figure 5A:
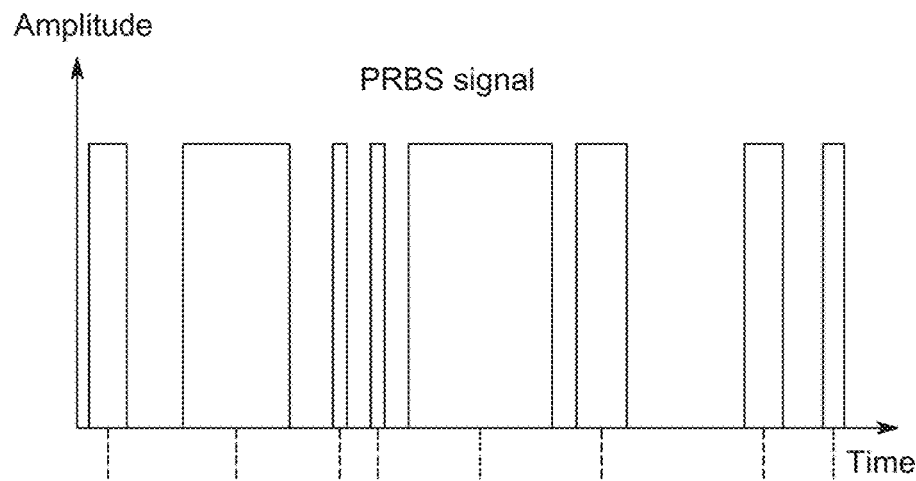
FIG. 5A shows an exemplary graph of a Pseudo Random Bit Sequence (PRBS) that is provided as a bias signal to a varactor in a scattering element.
Figure 5B:
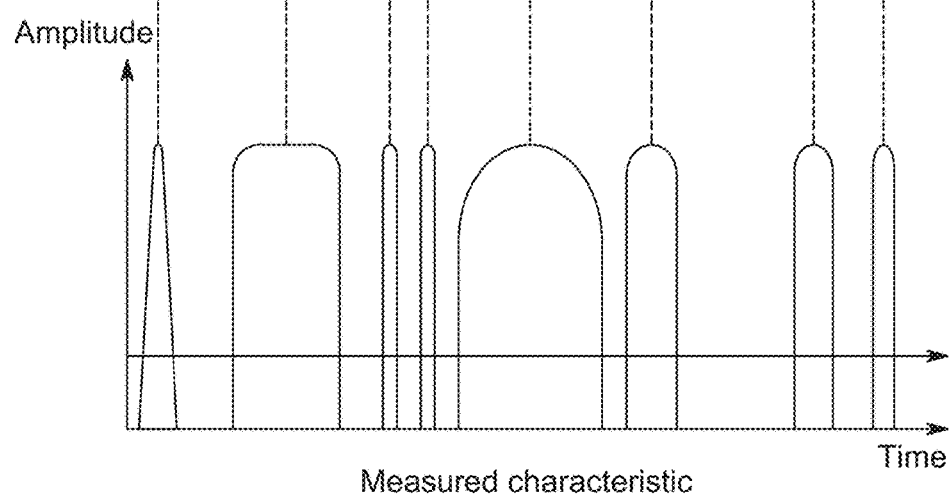
FIG. 5B illustrates an exemplary graph of a measured tone signal emitted by a scattering element having a varactor that is biased by a PRBS signal.

In FIG. 4, a method is shown for detecting incorrect behavior of individual scattering elements in a beam forming antenna or array of such antennas. Moving from a start block, an RF tone signal is provided to each scattering element in antenna at block 402. Stepping to block 404, each scattering element is separately and individually biased on and off with a bias signal. In one or more embodiments, the bias signal may be a pseudo-random bit sequence (PRBS) signal. An example of such a signal is shown in FIG. 5A. Also, the process measures a characteristic signal of each scattering element as it is randomly turned off and on while the tone RF signal is present. An example of a measured characteristic, such as Return Loss, of an output of an individual scattering element that is biased by the PRBS is shown in FIG. 5B. Additionally, in one or more embodiments, the bias signal may be periodically provided to the scattering element. In one or more embodiments, the on and off operation of the scattering element is controlled by a varactor that is biased on and off by the bias signal.

At block 406, each difference between the measured characteristic signal and the "on" and/or "off" level of the PRBS signal is identified and correlated. Also, an amount, type, or the like, of these differences identified for each scattering element may be compared and correlated with each other.

At decision block 408, if a current number of iterations are less than a confidence level value, then the process steps to block 410 where a frequency and/or phase of the RF signal may optionally be changed. However, in one or more embodiments, the frequency of the RF signal is not changed. The random nature of the PRBS signal is such that different measured characteristics can be detected during another iteration with the same RF signal. Next, the process loops back to block 402 and repeats the process at blocks 402, 404, and 406.

However, once the current number of iterations are equivalent to the confidence level value at block 408, the process steps to block 412 where the correlation differences are compared to one or more threshold values. For example, if a number of differences are less than a minimum threshold value, then the behavior of the scattering element is characterized as correct. Or if the number of correlation differences is greater than a maximum threshold value, then the behavior of the scattering element is characterized as incorrect.

Moving to block 414, a report is provided of the results of the comparison of the correlation differences to the one or more threshold values. This report may include a health report of the antenna, which could indicate a percentage and/or number of scattering elements that are characterized as behaving incorrectly. The report can include additional information, such as ambient temperature at the physical installation, age of the antenna, recent maintenance, a row of scattering elements not behaving correctly, a portion of antenna controlled by a controller not behaving properly, potential physical damage to the antenna based on signals from an accelerometer on the antenna (not shown) that may indicate a bird strike or the other trauma, or recent weather/earthquake information.

Additionally, in some embodiments, the antenna may include one or more circuits to record ambient temperature, or accelerometers to record significant physical movement (not shown in figures). Also, heuristics may be employed to identify common results of correlations and comparisons performed at certain times of day and during certain seasons. Next, the process returns to performing other actions.

Figure 6:
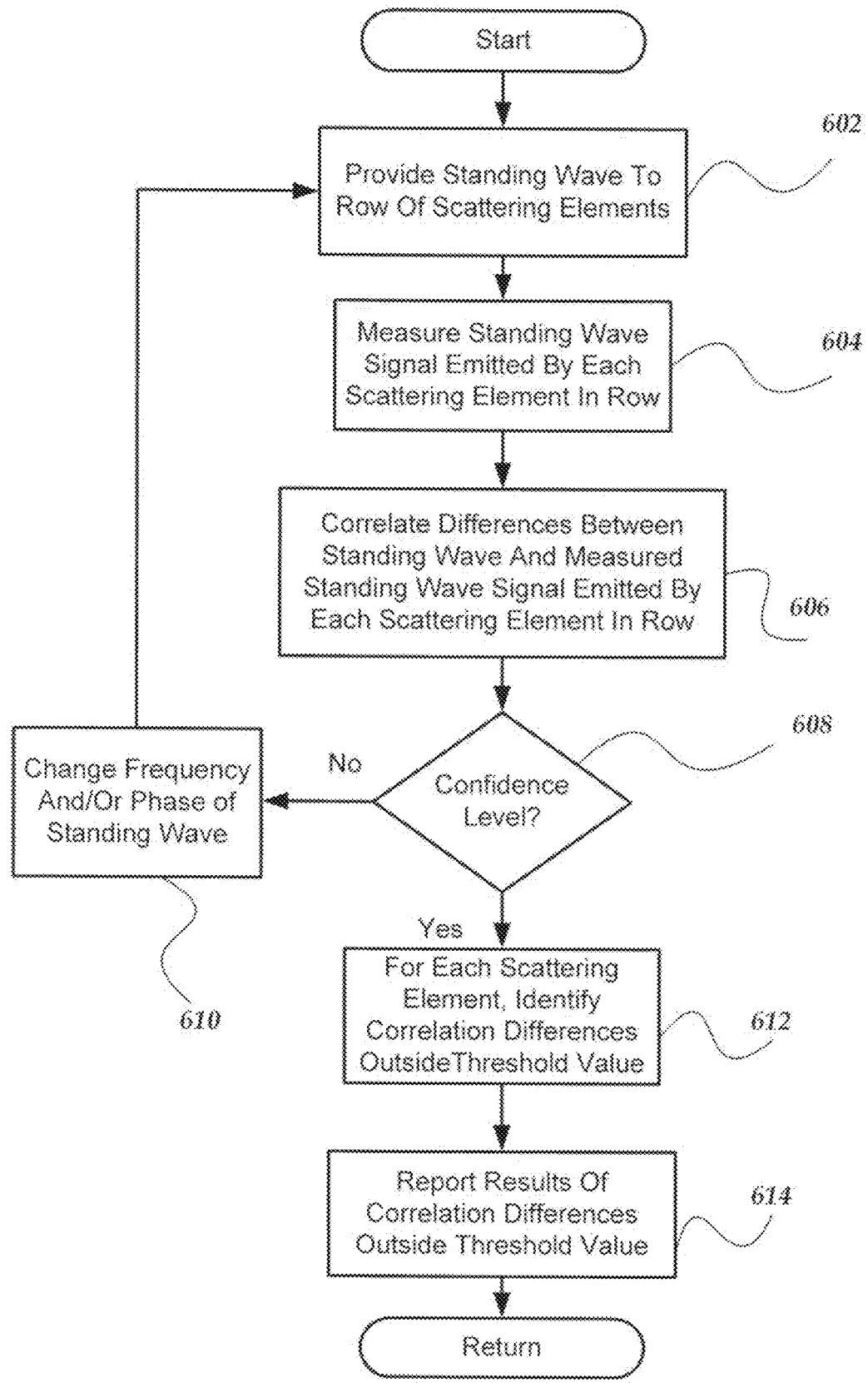
FIG. 6 shows an embodiment of a logical flow diagram for another exemplary method of correlating and reporting differences in behavior for scattering elements in an HMA that individually emit a portion of a standing wave applied to a row of scattering elements.
Figures 7A, 7B:
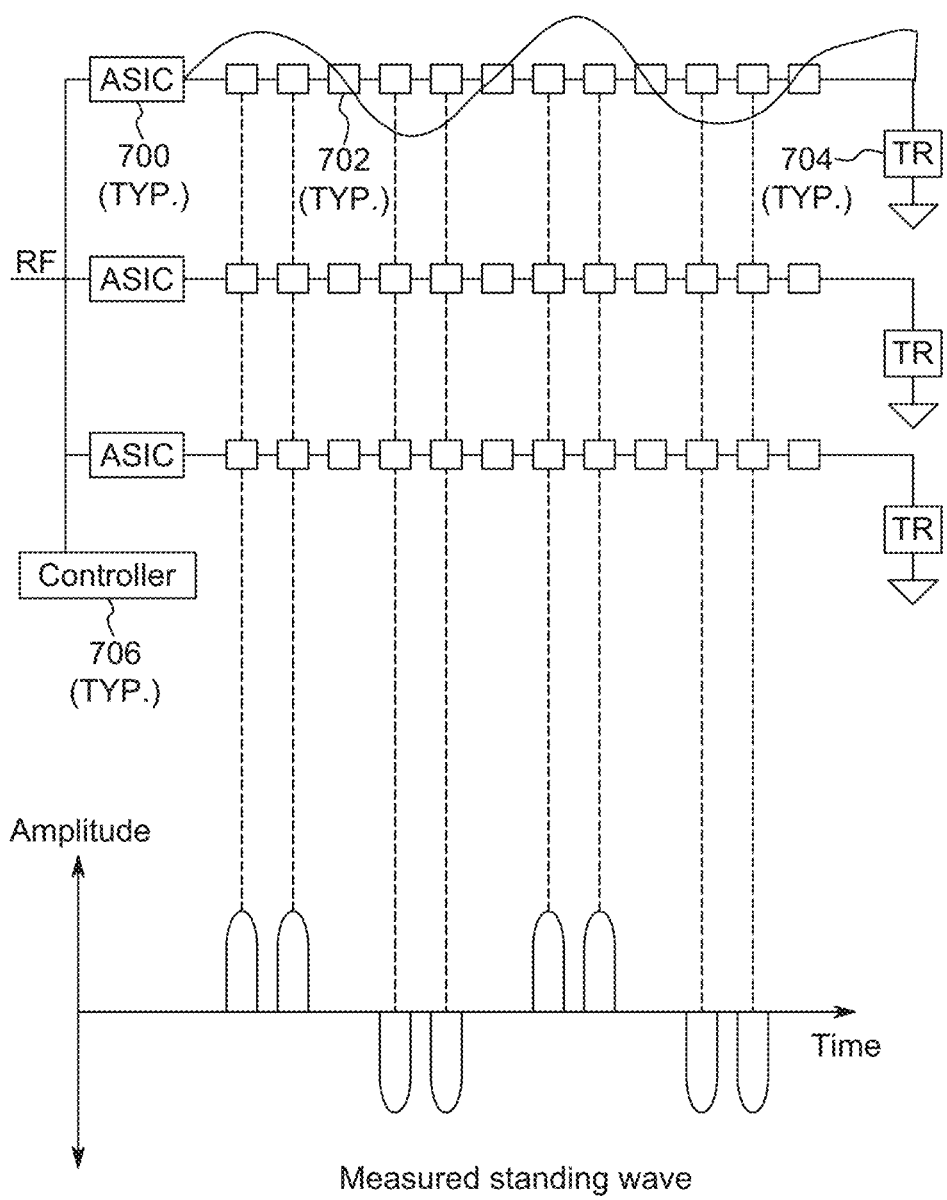
FIG. 7A is a schematic diagram of rows of scattering elements in an HMA that include a termination resistor at the end of the row, and a standing wave is applied to one of the rows of scattering elements.
FIG. 7B is a graph of measured portions of a standing wave emitted by individual scattering elements in a row of an HMA.

In FIG. 6, a method is shown for detecting incorrect behavior of individual scattering elements in a beam forming antenna or array of such antennas. Moving from a start block, an RF standing wave signal is provided to a row of scattering elements in an antenna at block 502. Stepping to block 604, each scattering element in the row is separately and individually biased on and off with a bias signal. In one or more embodiments, the bias signal may be a periodic signal or a PRBS signal. In one or more embodiments, the bias signal may be periodic. An example of such a standing wave RF signal applied to a row of scattering elements is shown in FIG. 7A. Also, the process measures a characteristic signal of each scattering element as it is turned (biased) off and on while the standing wave RF signal is present. An example of a measured characteristic, such as Return Loss, of the output of an individual scattering element that is on is shown in FIG. 7B. It is noteworthy that the measured characteristic of a scattering element is relatively large when it is physically located at a peak of the standing wave. Conversely, the measured characteristic of a scattering element is not present when it is physically located at a node (zero value) of the standing wave.

At block 606, each difference between the measured characteristic signal and the peaks and nodes of the standing wave RF signal is identified and correlated. Also, an amount, type, or the like, of these differences identified for each scattering element may be compared and correlated with each other.

At decision block 608, if a current number of iterations are less than a confidence level value, then the process steps to block 610 where a frequency and/or phase of the standing wave RF signal may optionally be changed. Next, the process loops back to block 402 and repeats the process at blocks 402, 404, and 406.

However, once the current number of iterations are equivalent to the confidence level value at block 608, the process steps to block 612 where the correlation differences are compared to one or more threshold values. For example, if a number of differences are less than a minimum threshold value, then the behavior of the scattering element is characterized as correct. Or if the number of correlation differences is greater than a maximum threshold value, then the behavior of the scattering element is characterized as incorrect.

Moving to block 614, a report is provided of the results of the comparison of the correlation differences to the one or more threshold values. This report may include a health report of the antenna, which could indicate a percentage and/or number of scattering elements that are characterized as behaving incorrectly. The report can include additional information, such as ambient temperature at the physical installation, age of the antenna, recent maintenance, a row of scattering elements not behaving correctly, a portion of antenna controlled by a controller not behaving properly, potential physical damage to the antenna based on signals from an accelerometer on the antenna (not shown) that may indicate a bird strike or the other trauma, or recent weather/earthquake information.

The processes illustrated in FIGS. 4 or 6 or a subset of the processes can be performed by one or more of the phase angle engine, the hologram function engine, bias signal engine, correlation engine, radio engine, applications, other engines, modules, and/or platforms.

It will be understood that each block of the flowchart illustrations, and combinations of blocks in the flowchart illustrations, (or actions explained above with regard to one or more systems or combinations of systems) can be implemented by computer program instructions. These program instructions may be provided to a processor to produce a machine, such that the instructions, which execute on the processor, create means for implementing the actions specified in the flowchart block or blocks. The computer program instructions may be executed by a processor to cause a series of operational steps to be performed by the processor to produce a computer-implemented process such that the instructions, which execute on the processor to provide steps for implementing the actions specified in the flowchart block or blocks. The computer program instructions may also cause at least some of the operational steps shown in the blocks of the flowcharts to be performed in parallel. Moreover, some of the steps may also be performed across more than one processor, such as might arise in a multi-processor computer system. In addition, one or more blocks or combinations of blocks in the flowchart illustration may also be performed concurrently with other blocks or combinations of blocks, or even in a different sequence than illustrated without departing from the scope or spirit of the invention.

Additionally, in one or more steps or blocks, may be implemented using embedded logic hardware, such as, an Application Specific Integrated Circuit (ASIC), Field Programmable Gate Array (FPGA), Programmable Array Logic (PAL), or the like, or combination thereof, instead of a computer program. The embedded logic hardware may directly execute embedded logic to perform actions some or all of the actions in the one or more steps or blocks. Also, in one or more embodiments (not shown in the figures), some or all of the actions of one or more of the steps or blocks may be performed by a hardware microcontroller instead of a CPU. In one or more embodiment, the microcontroller may directly execute its own embedded logic to perform actions and access its own internal memory and its own external Input and Output Interfaces (e.g., hardware pins and/or wireless transceivers) to perform actions, such as System On a Chip (SOC), or the like.

The above specification, examples, and data provide a complete description of the manufacture and use of the invention. Since many embodiments of the invention can be made without departing from the spirit and scope of the invention, the invention resides in the claims hereinafter appended.

What is claimed as new and desired to be protected by Letters Patent of the United States is:

1. A method to manage performance of an antenna with a network computer over a network, wherein one or more processors of the network computer execute instructions to perform actions of the method, comprising:
   employing a signal source to provide a signal to the antenna, wherein the antenna includes a plurality of scattering elements that are individually selectable to radiate the signal; and
   employing a control signal to individually turn off and turn on radiation of the signal by each of the plurality of scattering elements;
   determining one or more characteristics of each scattering element that is radiating the signal;
   determining one or more differences between the one or more determined characteristics of each scattering element radiating the signal; and
   providing a report regarding the one or more determined differences.

2. The method of claim 1, wherein determining the one or more differences further comprises:
   comparing the one or more differences to one or more threshold values, wherein each scattering element having determined difference that is less than a minimum threshold value is identified as performing correctly, and wherein each scattering element having the one or more differences that are greater than a maximum threshold value is identified as performing incorrectly.

3. The method of claim 1, wherein the one or more determined characteristics includes a return loss value for each scattering element that correspondingly employs a varactor to turn on and turn off radiation of the signal.

4. The method of claim 1, further comprising:
determining a confidence level for the one or more determined differences of the plurality of scattering elements; and
reiterating each previous step for the plurality of scattering elements until a number of iterations is equivalent to a value of the confidence level.

5. The method of claim 1, further comprising:
modifying one or more characteristics of the signal that include one or more of a phase, or a frequency; and
employing the modified signal to reiterate each previous step for each of the plurality of scattering elements.

6. The method of claim 1, wherein the report further comprises:
providing additional information associated with the antenna over time including one or more of ambient temperature, weather, accelerometer information, maintenance record, or age of the antenna.

7. The method of claim 1, wherein the antenna further comprises one or more of an array of antennas or holographic metasurface antennas.

8. A system for managing performance of an antenna with a network computer, comprising:
the network computer includes:
a memory for storing instructions; and
one or more processors that execute the instructions to perform actions, comprising:
employing a signal source to provide a signal to the antenna, wherein the antenna includes a plurality of scattering elements that are individually selectable to radiate the signal; and
employing a control signal to individually turn off and turn on radiation of the signal by each of the plurality of scattering elements;
determining one or more characteristics of each scattering element that is radiating the signal;
determining one or more differences between the one or more determined characteristics of each scattering element radiating the signal; and
providing a report regarding the one or more determined differences.

9. The system of claim 8, wherein determining the one or more differences further comprises:
comparing the one or more differences to one or more threshold values, wherein each scattering element having determined difference that is less than a minimum threshold value is identified as performing correctly, and wherein each scattering element having the one or more differences that are greater than a maximum threshold value is identified as performing incorrectly.

10. The system of claim 8, wherein the one or more determined characteristics includes a return loss value for each scattering element that correspondingly employs a varactor to turn on and turn off radiation of the signal.

11. The system of claim 8, further comprising:
determining a confidence level for the one or more determined differences of the plurality of scattering elements; and
reiterating each previous step for the plurality of scattering elements until a number of iterations is equivalent to a value of the confidence level.

12. The system of claim 8, further comprising:
modifying one or more characteristics of the signal that include one or more of a phase, or a frequency; and
employing the modified signal to reiterate each previous step for each of the plurality of scattering elements.

13. The system of claim 8, wherein the report further comprises:
providing additional information associated with the antenna over time including one or more of ambient temperature, weather, accelerometer information, maintenance record, or age of the antenna.

14. The system of claim 8, wherein the antenna further comprises one or more of an array of antennas or holographic metasurface antennas.

15. An antenna that is managed by a network computer, comprising:
an antenna that includes a plurality of scattering elements;
a signal source; and
a communication interface with the network computer, wherein the network computer performs actions, including:
employing a signal source to provide a signal to the antenna, wherein the antenna includes a plurality of scattering elements that are individually selectable to radiate the signal; and
employing a control signal to individually turn off and turn on radiation of the signal by each of the plurality of scattering elements;
determining one or more characteristics of each scattering element that is radiating the signal;
determining one or more differences between the one or more determined characteristics of each scattering element radiating the signal; and
providing a report regarding the one or more determined differences.

16. The antenna of claim 15, wherein determining the one or more differences further comprises:
comparing the one or more differences to one or more threshold values, wherein each scattering element having determined difference that is less than a minimum threshold value is identified as performing correctly, and wherein each scattering element having the one or more differences that are greater than a maximum threshold value is identified as performing incorrectly.

17. The antenna of claim 15, wherein the one or more determined characteristics includes a return loss value for each scattering element that correspondingly employs a varactor to turn on and turn off radiation of the signal.

18. The antenna of claim 15, further comprising:
determining a confidence level for the one or more determined differences of the plurality of scattering elements; and
reiterating each previous step for the plurality of scattering elements until a number of iterations is equivalent to a value of the confidence level.

19. The antenna of claim 15, further comprising:
modifying one or more characteristics of the signal that include one or more of a phase, or a frequency; and
employing the modified signal to reiterate each previous step for each of the plurality of scattering elements.

20. The antenna of claim 15, wherein the report further comprises:
providing additional information associated with the antenna over time including one or more of ambient temperature, weather, accelerometer information, maintenance record, or age of the antenna.

* * * * *